Feb. 23, 1926.
L. C. BAYLES
1,574,016
ROCK DRILL FRONT END
Filed March 12, 1925
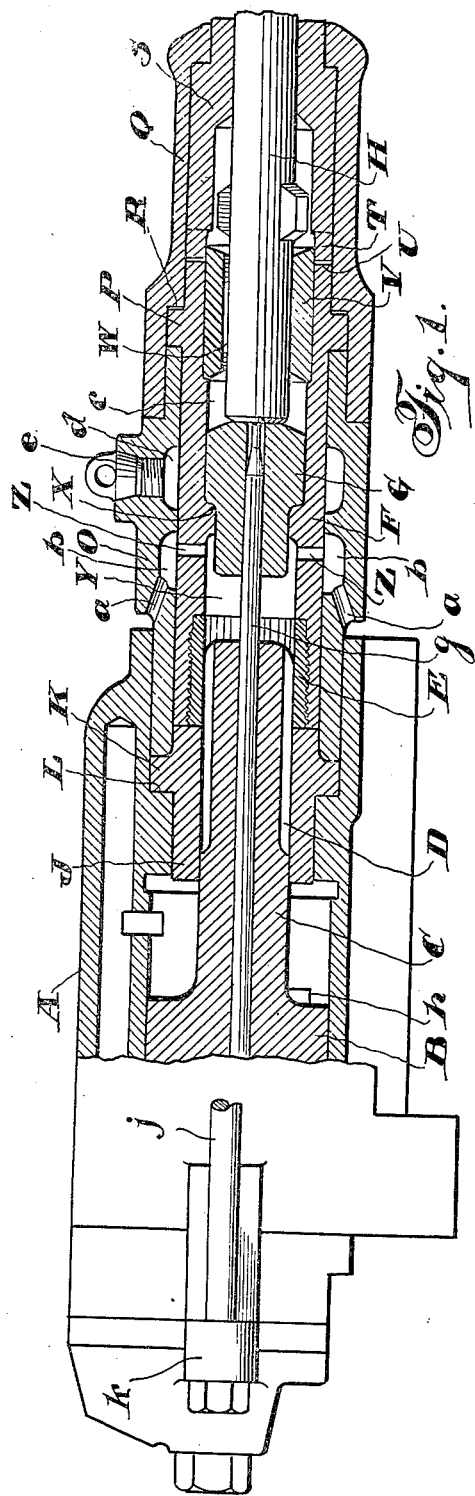
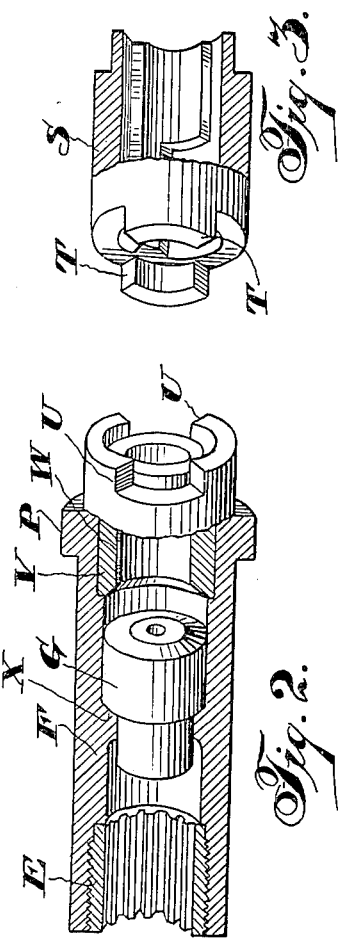
INVENTOR.
Lewis C. Bayles
BY Herbert G. Ogden
HIS ATTORNEYS.

Patented Feb. 23, 1926.

1,574,016

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

ROCK-DRILL FRONT END.

Application filed March 12, 1925. Serial No. 14,950.

*To all whom it may concern:*

Be it known that I, LEWIS C. BAYLES, a citizen of the United States, a resident of Easton, in the county of Northampton and State of Pennsylvania, have invented a certain Rock-Drill Front End, of which the following is a specification accompanied by drawings.

This invention relates to rock drills of the hammer type, but more particularly to the construction of the front end which includes an anvil block lug chuck.

The objects of the invention are to strengthen and at the same time simplify a chuck of this type, permit the parts to be readily assembled and taken apart, adapt the chuck for the addition of dust preventing elements and for efficient lubrication.

To these ends the invention consists of the combinations of elements and features of construction shown in the accompanying drawings, in which—

Figure 1 is a side view partly in longitudinal section, showing so much of a rock drill as will serve to illustrate the invention, Figure 2 is a detail side view partly in longitudinal section and partly in perspective, showing the chuck and parts cooperating therewith, and Figure 3 is a view similar to Figure 2, showing the chuck jaw.

Referring to the drawings, a cylinder A of the rock drill is provided with the reciprocating piston B having the forward shank C upon which are formed the usual flutes D cooperating with the fluted chuck nut E in the chuck F. The blows of impact of the piston are transmitted through the anvil block G to the shank of the lugged drill steel H extending into the front end of the rock drill, the front head assembly being held together by the usual side bolts *j* extending from flanges on the front head (not shown in the drawing) to the flanges K on the back head. The water tube *g* has a working fit on the anvil block and the anvil block has a working fit in the chuck.

The forward shank of the piston extends through the front cylinder washer J having a flange K bearing against a shoulder L in the cylinder, and a front cylinder extension O extends within the cylinder against the flange K of the washer which provides a firm bearing for the front cylinder extension against the washer and between the cylinder A and the chuck F.

The chuck F is provided with an external flange P adapted to bear against the cylinder extension O, and the front head Q is provided with a shoulder R for holding the chuck in position, slight clearance preferably being provided between the front head shoulder R and the chuck flange P. The loose chuck jaw S is located within the front head and is provided with the jaws T cooperating with the jaws U on the chuck F. The chuck sleeve V within the forward end of the chuck is preferably provided with a longitudinal hole or slot W for the free passage to atmosphere of any air which may leak into the chuck parts. The chuck F is also provided with an internal shoulder X forming a stop for the anvil block G.

The relative lengths of the smooth and fluted portions of the forward shank of the piston are such with relation to the stroke of the piston, that the flutes are sealed from the main piston chamber as indicated in Figure 1 except when the main exhaust *h* is open to atmosphere so that no pressure is in the front end of the cylinder. In Figure 1 the piston is shown nearing the rearward end of its rearward stroke. No air passes from the cylinder to the chuck cavity Y except such a small quantity of air as may be due to leakage. The chuck F is provided with the vents Z and the front cylinder extension O is provided with the vents *a* while between the two sets of vents is provided a cavity or chamber *b* which acts as a settling chamber and prevents dirt and extraneous material from being sucked back into the front end parts of the machine in case there is any tendency to form a partial vacuum in said parts during the operation of the piston. Since the chuck cavity Y is maintained substantially at atmospheric pressure, there is no fluid pressure on the anvil block G tending to force air past or through the anvil block, but any air which may leak into the cavity *c* into which the shank of the steel extends will pass to atmosphere through the groove W in the chuck sleeve V. Efficient means are provided for lubricating the front end parts of the rock drill by providing a lubricating chamber *d* preferably in the front cylinder extension at a point forward of the vents Z and *a* and this chamber is provided with the filling plug *e* as usual.

I claim:

1. In a rock drill, the combination of a cylinder and piston, of a front cylinder washer having a flange bearing against a shoulder in the cylinder, a front cylinder extension extending within the cylinder against the flange of the cylinder washer, a chuck within the cylinder extension having an external flange adapted to bear against the extension, a front head having a shoulder bearing against the said external flange for holding the chuck in position, and a loose chuck jaw within the forward end of the front head and clutched to the chuck.

2. In a rock drill, the combination of a cylinder and piston, of a front cylinder washer having a flange bearing against a shoulder in the cylinder, a front cylinder extension extending within the cylinder against the flange of the cylinder washer, a chuck within the cylinder extension having an external flange adapted to bear against the extension, an anvil block in the chuck and an internal shoulder on the chuck forming a stop for the anvil block, a front head having a shoulder bearing against the said external flange for holding the chuck in position, and a loose chuck jaw within the forward end of the front head and clutched to the chuck.

In testimony whereof I have signed this specification.

LEWIS C. BAYLES.